Oct. 21, 1930.    S. J. T. PRICE    1,779,105
FOLDING MACHINE
Filed Jan. 20, 1926    10 Sheets-Sheet 1
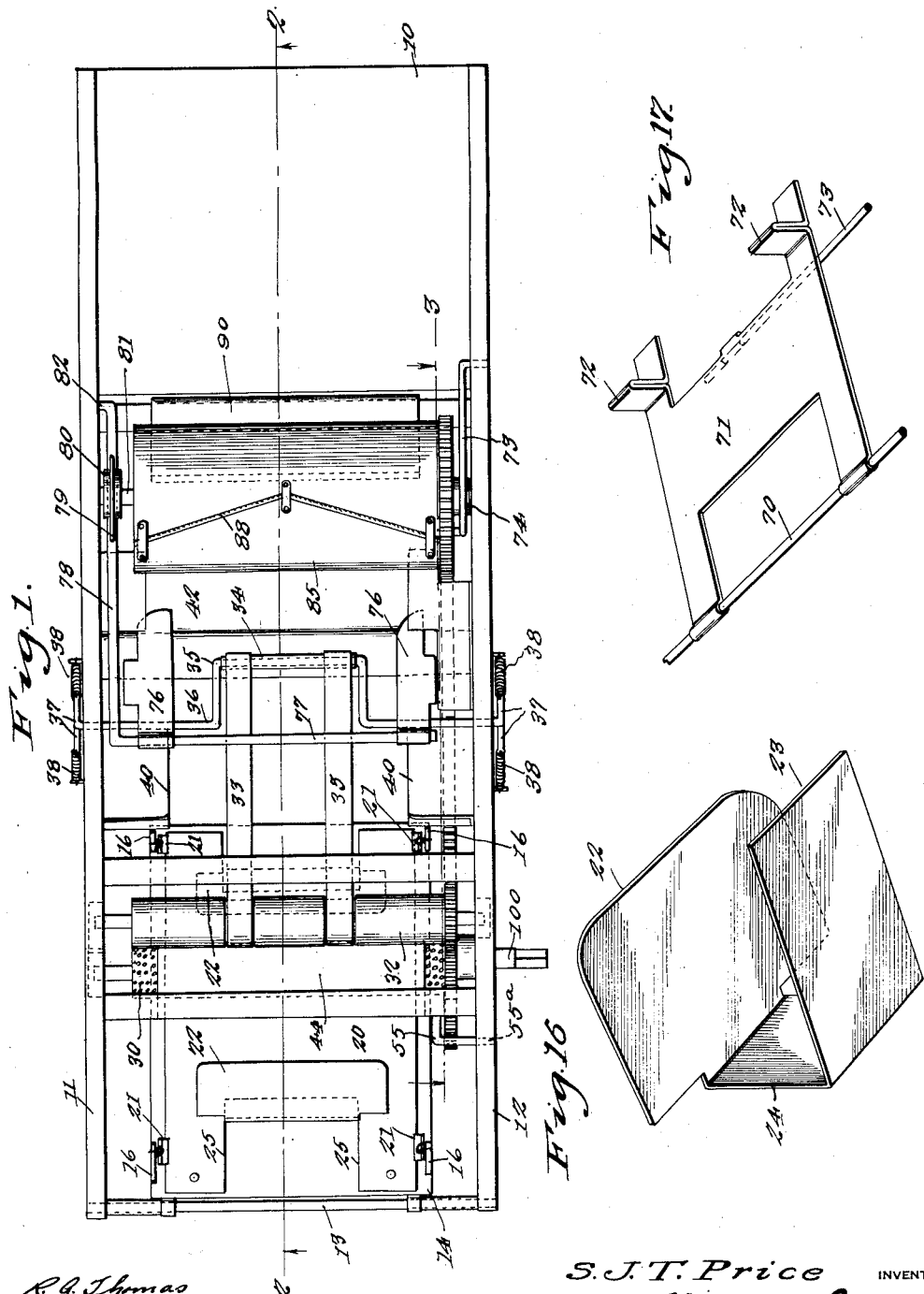
S. J. T. Price  INVENTOR

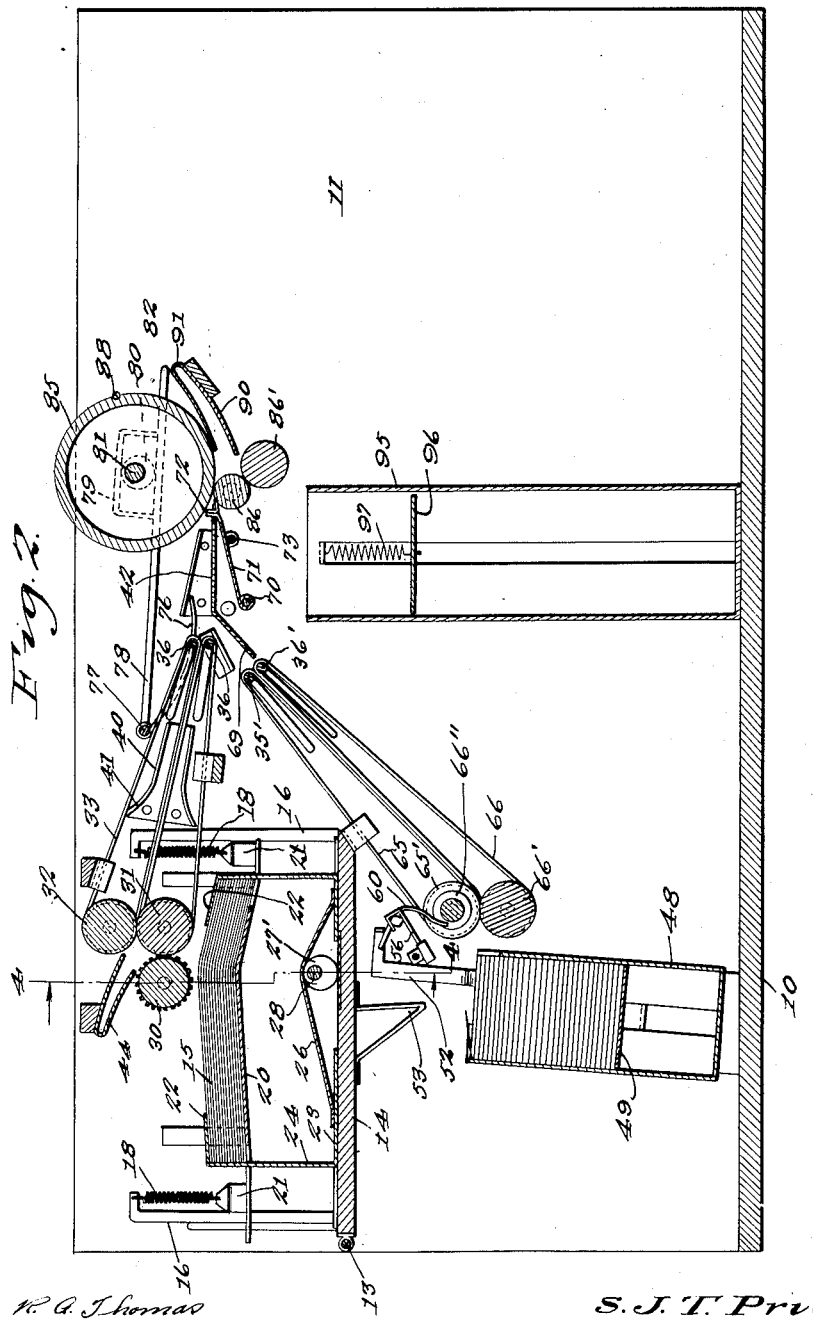

Oct. 21, 1930.  S. J. T. PRICE  1,779,105
FOLDING MACHINE
Filed Jan. 20, 1926  10 Sheets-Sheet 3
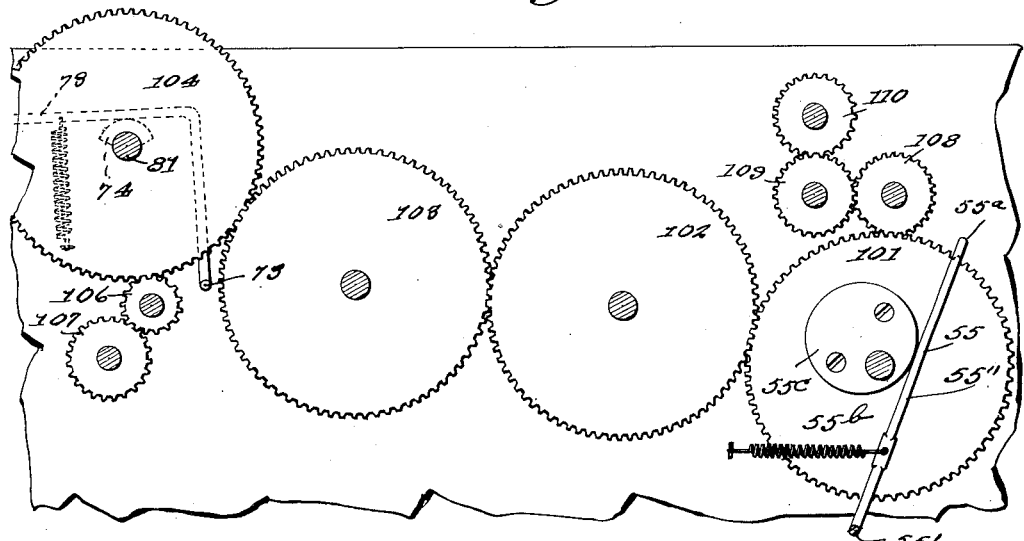
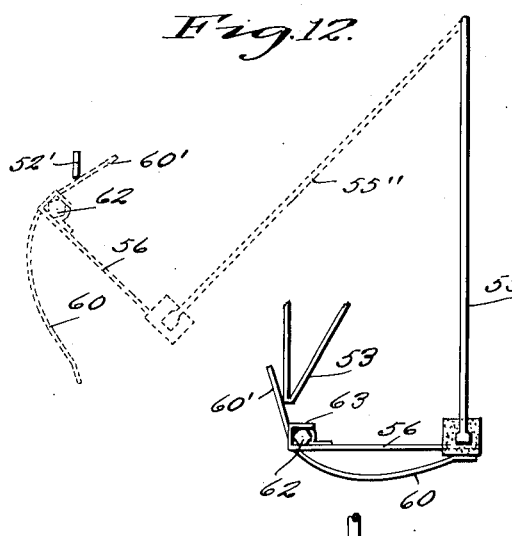
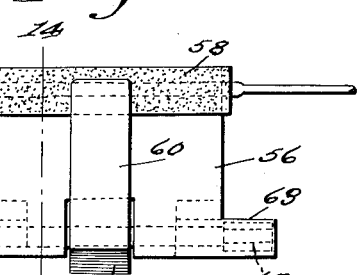
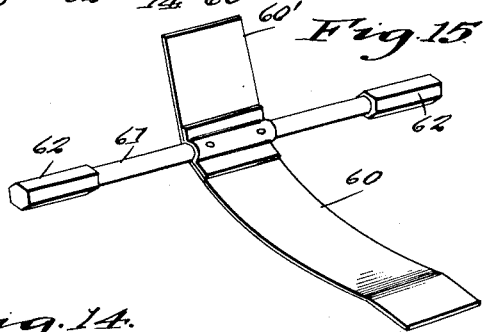
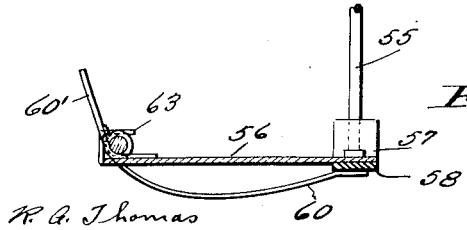
S. J. T. Price INVENTOR
BY *Victor J. Evans*
ATTORNEY
WITNESS:

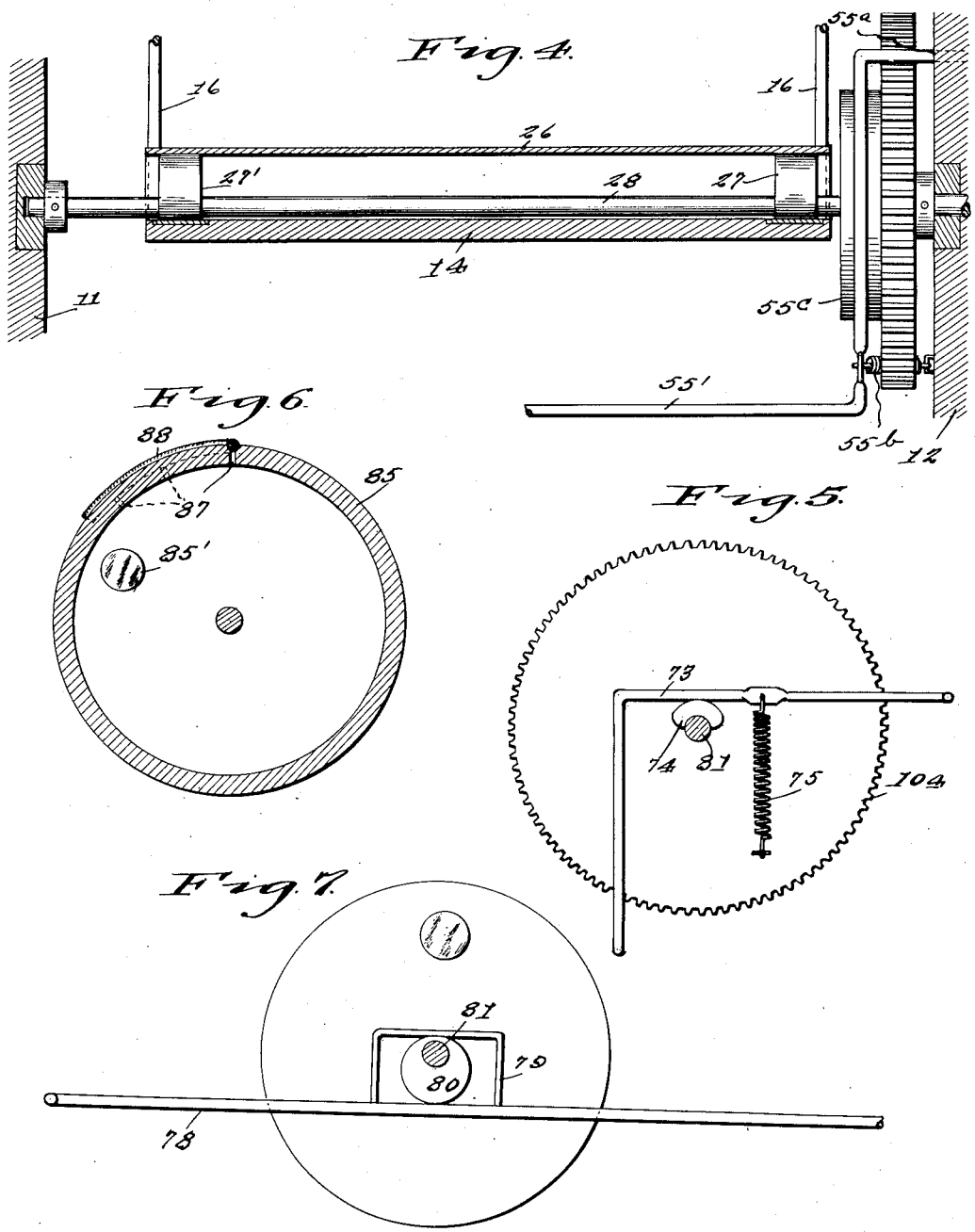

Oct. 21, 1930.   S. J. T. PRICE   1,779,105
FOLDING MACHINE
Filed Jan. 20, 1926   10 Sheets-Sheet 5
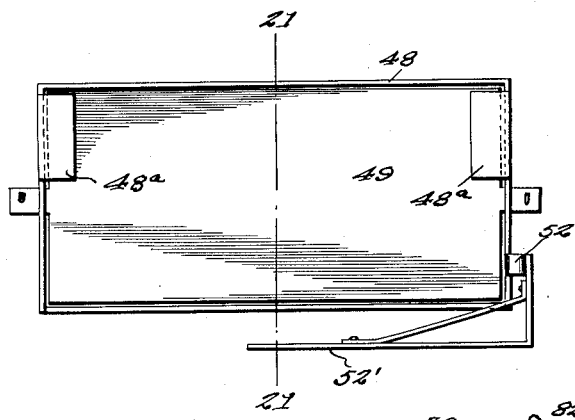
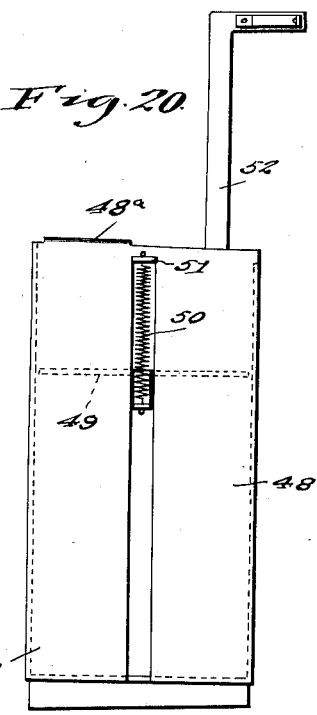
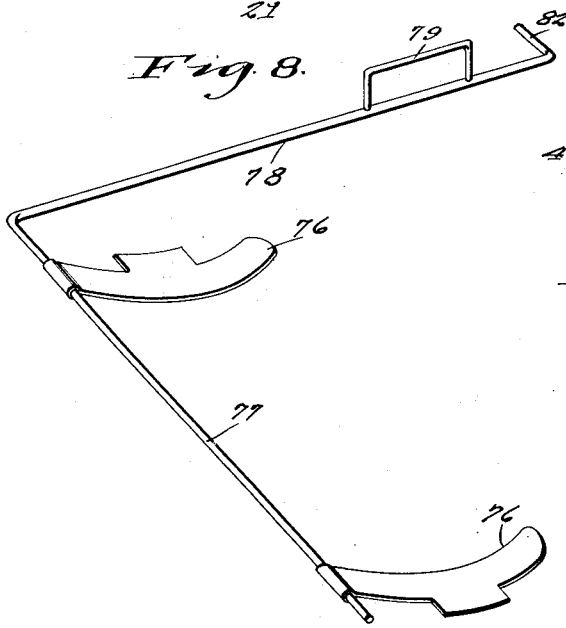
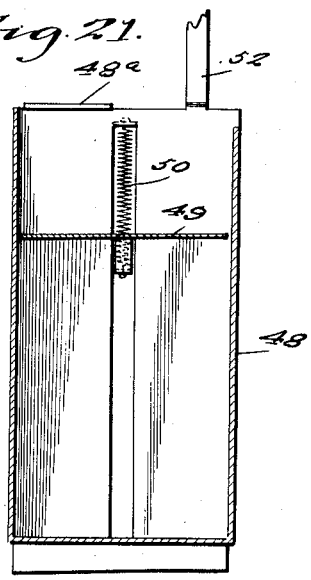
S. J. T. Price INVENTOR

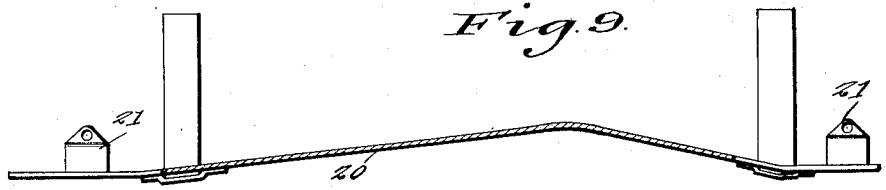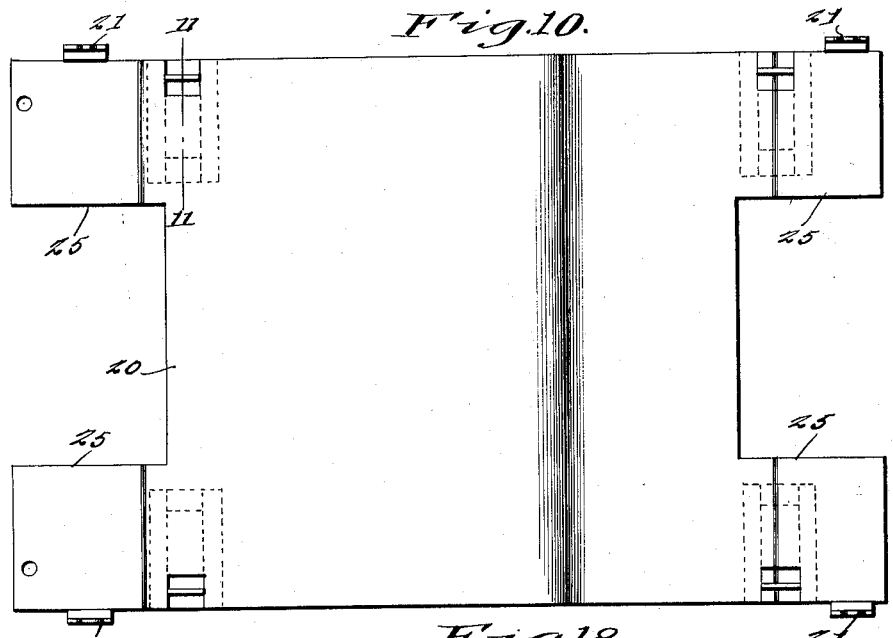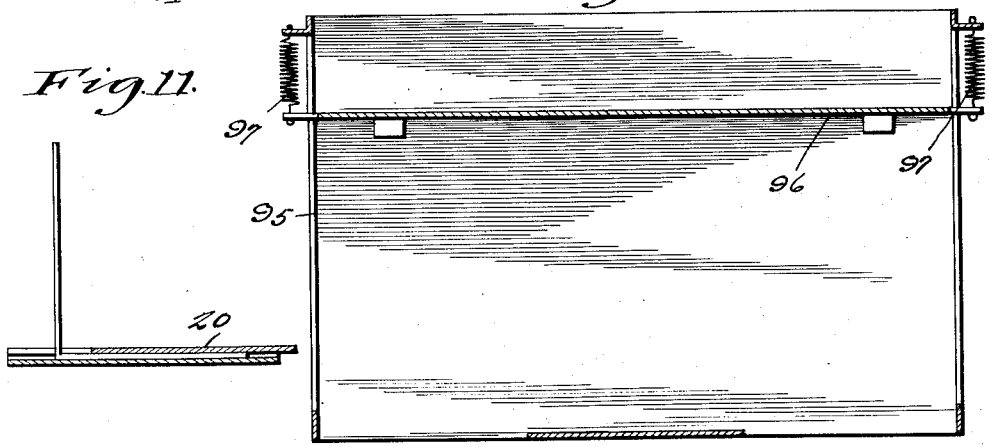

Oct. 21, 1930.   S. J. T. PRICE   1,779,105
FOLDING MACHINE
Filed Jan. 20, 1926   10 Sheets-Sheet 7

S. J. T. Price INVENTOR
BY Victor J. Evans
ATTORNEY

WITNESS:
R. A. Thomas

Oct. 21, 1930.   S. J. T. PRICE   1,779,105
FOLDING MACHINE
Filed Jan. 20, 1926    10 Sheets-Sheet 8
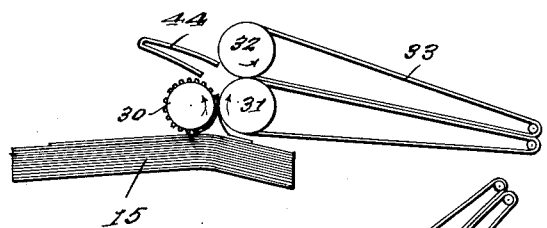
Fig. 23.
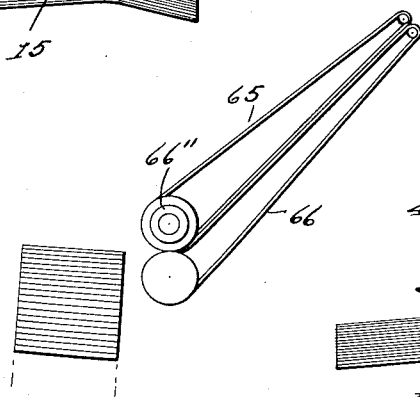
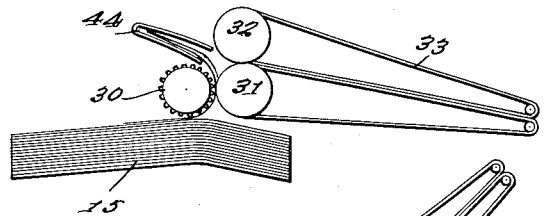
Fig. 24.
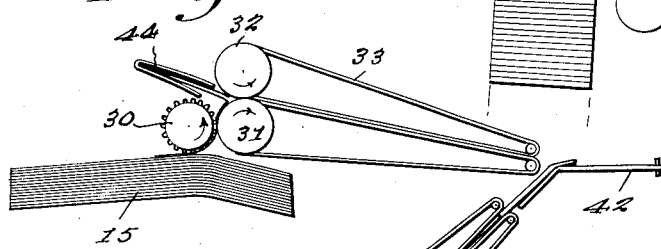
Fig. 25.
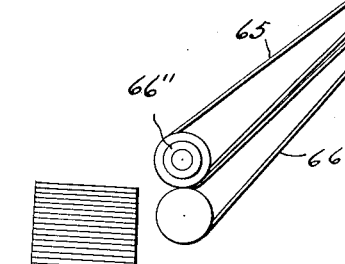
S. J. T. Price  INVENTOR Oct. 21, 1930.  S. J. T. PRICE  1,779,105
FOLDING MACHINE
Filed Jan. 20, 1926  10 Sheets-Sheet 9
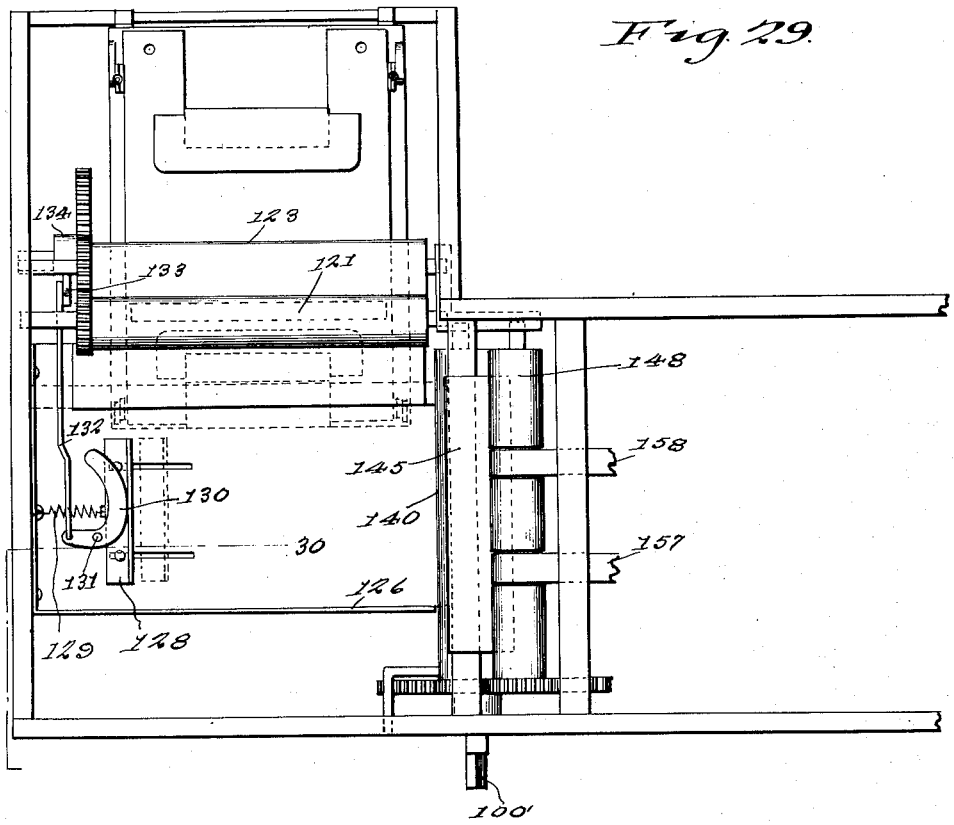
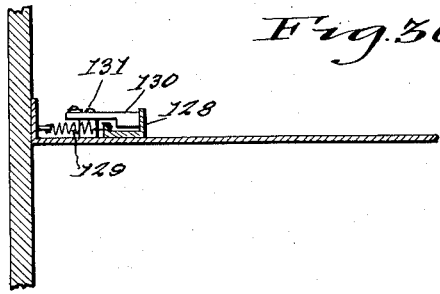
S. J. T. Price
INVENTOR

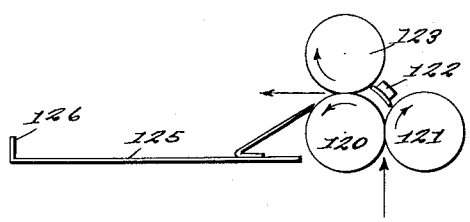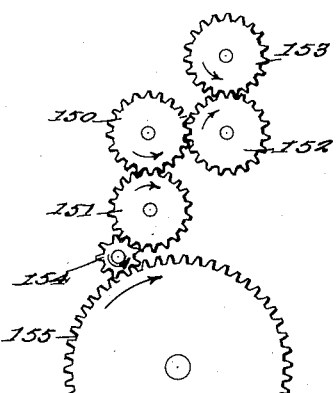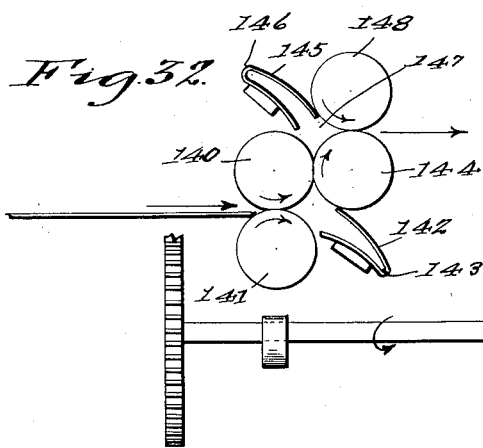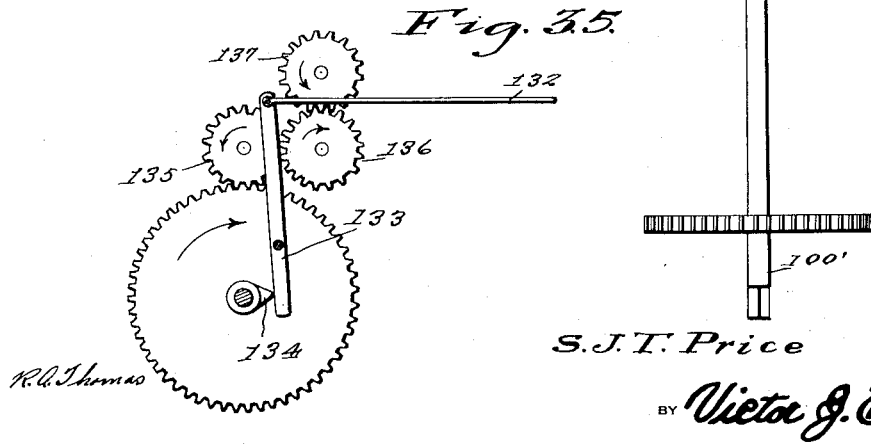

Patented Oct. 21, 1930

1,779,105

UNITED STATES PATENT OFFICE

SAMUEL J. T. PRICE, OF AUBURN, ALABAMA

FOLDING MACHINE

Application filed January 20, 1926. Serial No. 82,583.

This invention relates to folding machines, and particularly to a mechanism intended and adapted to take letter sheets, circulars, or other envelope enclosures in flat form, fold the same in the required manner to fit the envelope and then present the folded letter or other sheet to be inserted in an envelope and sealed therein.

The object of this invention is to provide mechanism for folding letter sheets and conveying them to a point to which envelopes are also conveyed.

A further object is to provide a particular form of device for receiving and supporting any number of sheets to be folded and specially constructed folding mechanism.

A further object is to provide, in one form of the device, means for folding a sheet twice, for a long envelope, such as a number 8 envelope of standard size, and to provide in another form of the device, means for placing a single middle fold in a sheet, and thereafter two additional folds perpendicularly of the first fold, and in the position in which they are usually formed when folding a sheet for a small envelope.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1 is a view of the machine in top plan.

Figure 2 is a vertical longitudinal section, on line 2—2 of Figure 1.

Figure 3 is a vertical section on line 3—3 of Figure 1, looking in the opposite direction, as compared with the view shown in Figure 2.

Figure 4 is a vertical section thru the receptacle receiving the sheets to be folded, the section being on line 4—4 of Figure 2.

Figure 5 is a detail view of the cam mechanism, shown at the left of Figure 3, and looking in the opposite direction.

Figure 6 is a section thru the roller or cylinder carrying a fibrous element for moistening the gummed flap of the envelope.

Figure 7 is a detail view of the cam mechanism shown partly in dotted line in the upper part of Figure 2, and controlling a finger adapted to project into the envelope for opening the latter, or lifting the back of said envelope.

Figure 8 is a perspective view of the cam controlled device shown in the upper right hand part of Figure 2, for opening the envelope for the reception of the folded sheet.

Figure 9 is a detail in vertical section, showing the carrier for the pile of letter sheets.

Figure 10 is a plan view of the carrier of Figure 9, shown also in Figure 2.

Figure 11 is a detail in section on the line 11—11 of Figure 10.

Figure 12 is a detail view, showing an envelope pick-up device.

Figure 13 is a bottom plan view of said device.

Figure 14 is a section on line 14—14 of Figure 13.

Figure 15 is a perspective view of the flat finger shown in bottom plan in Figure 13, and shown in edge elevation in Figures 12 and 14.

Figure 16 is a perspective view showing one of the devices appearing in vertical section in Figure 2 and in top plan at the left of Figure 1 for retaining the end portions of the letter sheets.

Figure 17 is a perspective view of a plate to be pivoted or swung beneath a table which receives the envelope and above which the letter sheet is inserted within said envelope, while the latter is in contact with the stops shown at the right of Figure 17.

Figure 18 is a vertical section thru the final receptacle shown at the lower central part of Figure 2.

Figures 19, 20 and 21 are, respectively, a plan view, an end elevation and a vertical section of the envelope container shown in the lower left part of Figure 2, these views being at a small angle with reference to the section of Figure 2.

Figure 26:
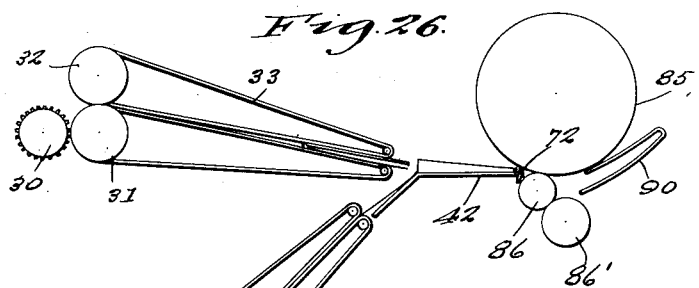

Figures 23 to 28 inclusive are diagrammatic views, showing the different steps in the operation of folding the sheet, inserting it into an envelope, closing the flap and discharging the closed envelope to a final receptacle.

Figure 29 is a plan view of a modified form of the machine in which a letter sheet is folded in the middle, and is then folded twice, in a direction perpendicular to the first fold, for insertion into a small envelope.

Figure 30 is a detail in section on the line 30—30 of Figure 29, and showing a cam operated device for imparting movement to the sheet, in a lateral direction.

Figure 31 is a diagrammatic view of certain of the rollers of Figure 29.

Figure 32 is a diagrammatic view showing the rollers and associated means for placing the second and third folds in the sheet, when the latter is to be inclosed in a small envelope.

Figure 33 is a diagrammatic view of the gearing in the lower central portion of Figure 29.

Figure 34 shows the drive from one of the gear wheels in the lower part of Figure 29, to one of the gear wheels forming a part of the train of gearing at the left of Figure 29.

Figure 35 shows cam controlled means appearing in Figure 29 and designed to operate the sheet feeding device in the lower left hand corner of Figure 29.

In the present instance I have illustrated my improved folding mechanism embodied in a machine adapted to carry through the successive steps of enclosing the folded sheet in an envelope and sealing the same, and it will be appreciated that the present disclosure is but one adaptation here shown for purposes of better illustrating the construction and operation of the folding mechanism.

A housing, frame, or other suitable construction for mounting the operative parts of the device, and the receptacles employed, includes a base 10 and vertical side members 11 and 12, the latter mounting, directly or indirectly, a transverse element or shaft, such as 13, serving as a pivotal support for the bottom member 14 of a container for the letter sheets. A pile of these sheets is shown at 15, and the carrying means therefor permit of the reception of any number of sheets, within the limit of the device, and permit or provide for the placing of the upper sheet of the pile in a given position with reference to the rollers above the supply of letter sheets, at all stages of the operation of folding the entire supply within the container.

Extending upwardly from bottom member 14, which as stated, is pivotally mounted at 13, are standards, such as 16, each having an off-set portion at its upper end, and having connected with the off-set portion a coiled spring 18, adapted to support the carrying means comprising a floating plate 20 having formed thereon or connected therewith, ears 21, which in turn are connected with the lower ends of springs 18. This arrangement permits of carrying the pile of sheets 15 in an upward direction, so that there is a constant feed, and the upper sheet will be in contact with holding device 22, forming a flange on the element shown in Figure 16. This element is of approximately U-form in cross-section, and includes the lower plate 23 and the intermediate or web portion 24, positioned with reference to the edges 25 of plate 20 in the manner shown in Figures 1 and 2. The elements shown in Figure 16 constitute sheet holding and guiding elements and are stationary, so far as vertical movement with respect to member 14 is concerned, the element 20 being movable upwardly, but the devices of Figure 16 are slidable in a horizontal direction, the lower plate portions 23 being adapted to pass under the plate 26 of Figure 2, to a variable extent, so that the paper holding and guiding devices are adjustable in accordance with the size of the sheets.

A cam or eccentrically mounted element 27 is carried by a shaft or mounting element 28, and is adapted to raise the entire sheet container to a position permitting frictional contact between roller 30 and the upper sheet of the pile 15 and to lower the entire sheet container away from roller 30. It will be observed that cam 27 acts on the plate 26 and produces the elevating or lifting movement of the entire sheet container carried by the base 14 which meanwhile swings about the pivotal support 13. Cam 27' serves a similar purpose. It will be noted that the surface of roller 30 is roughened in order to facilitate the picking up of the upper sheet.

Adjacent to roller 30 is a roller 31 carrying two conveyor bands, or carrying if preferred, a single apron constituting a continuous belt. Above roller 31 is a roller 32 similarly provided with belts, such as 33, these belts passing forwardly to a roller 34 mounted on a crank portion 35 of shaft 36. The shafts 36 of the upper and lower belts of this letter sheet carrying mechanism, each include an offset portion such as 37, controlled by a coiled spring, such as 38, so that the shafts 36 are resiliently held. Guide members 40 of channel form, as shown in Figure 2, and having flared ends 41, are positioned on each side of the sheet conveying means, and the sheets are carried to a table 42, to which the envelope has been conveyed in time for the reception of the sheet.

Above roller 31 is a channel member or cross-sectionally U-shaped member 44, having its side portions deflected as shown with reference to the horizontal, and with reference to the surfaces of rollers 30, 31 and 32. Upon the movement of the cam 27 to a position lifting the letter sheets into contact with roller 30, the rollers 30 and 31 rotating in the direction of the arrows, will pick up the sheet at the required point, in the manner shown in Figure 23, and will carry the bulged portion of the sheet 15 upwardly, the fold then passing into the U-member 44, as shown in Figure 24.

The bend of the element 44 is such that the folded part of the sheet tends to produce a second bulge at the point shown in Figure 25, so that the letter sheet is then engaged by the upper roller 32, and the fold now produced passes between rollers 32 and 31, and the sheet is conveyed by the belts 33 to a position for entering the envelope to be fed or conveyed to table 42.

The envelopes are fed from container 48, which includes a spring suspended false bottom 49, the springs being designated 50 and being mounted at 51 on devices projecting from the walls of the container. Envelope container 48 is shown in Figures 2 and 19 to 21. Arm 52 projects upwardly from the container and carries a stop 52′ for the envelope pick-up mechanism, shown in Figure 2 and shown in detail in Figures 12 to 15, inclusive. Another stop is designated 53. In Figure 12, the envelope pick-up device is shown as if the observer were looking at the mechanism from the opposite side of the machine, with reference to the showing in Figure 2.

This envelope pick-up device includes the arm 55 having rigid connection with a plate or the like, designated 56, a reinforcing or strengthening element 57 appearing in Figure 14 adjacent to the point of connection. On the under side of plate 56 is a strip of rubber or the like, designated 58 and mounted opposite the free end of the finger 60, it being assumed that the latter is in closed position. This element 60 is, however, movable about an axis represented by the rod 61 rigid with reference to the finger and having angular portions 62 on opposite ends thereof. These angular or hexagonal portions 62 cooperate with the resilient devices 63 on plate 56, and the rod 61 and finger 60 are thereby held in a position determined by the impact of end 60′ of element 60 with the stop 52′, or the stop 53, as the case may be.

In Figure 2, the upper envelope is shown as having its gummed flap projecting upwardly, in position for engagement by the finger 60 when the latter is in the position of Figure 2 or in the dotted line position of Figure 12, which is the equivalent thereof, it being understood that the view represented by Figure 12 shows the device from the opposite side of the machine, as compared with the illustration in Figure 2. When the arm 55 is in the dotted line position of Figure 12, the upper stop 52′ is engaged to open finger 60, which is to receive the gummed flap of the envelope. When the arm 55 moves to the full line position of Figure 12, stop 53 is engaged and the envelope is grasped by said finger 60, the swinging of arm 55 carrying the envelope to a position where it is engaged by conveyor belts 65 and 66 operating over rollers 65′ and 66′, the upper roller having a reduced portion at 66″ for the accommodation of the finger 60. These conveyor belts are tensioned in the same manner that the upper belts moving the letter sheets are tensioned, that is, by crank portions 35′ of shafts 36′ rotatable or partly rotatable under the influence of springs such as 38.

The envelopes are thus carried upwardly, in Figure 2 between the belts 65 and 66, and pass onto a guiding plate or the like designated 69 and leading to table 42. Under plate 42, constituting a table, is a pivoted plate 71 of the form shown in Figure 17, the pivotal mounting being by means of rod 70 with which ears projecting from plate 71 are connected. Stops 72 are formed on the plate 71, and limit the movement of the envelope temporarily. At the proper time, plate 71 moves downwardly under the action of arm 73, and releases the envelope, so that it may travel forwardly, or to the right in Figure 2, after the letter sheet has been inserted. Arm 73 of Figure 17 is controlled by cam 74 shown at the left of Figure 3 and in Figures 1 and 5, the spring 75 tending to move the arm 73 downwardly after it is acted upon by the cam.

It being assumed that the enevelope is on table 42 in engagement with stops 72, the back of the envelope is to be lifted, by fingers 76 carried by the transverse portion 77 of arm 78 of Figures 2, 7 and 8. This arm 78 includes a U-portion or loop 79, engaged by a cam 80 on shaft 81, and said arm 78 is pivotally mounted at 82. In the plan view of Figure 1, it will be observed that the fingers 76 on arm 77 rest on the transverse shaft 36, and the fingers have not only a lifting movement incident to the movement of cam 80, but have a lateral movement, so that the said fingers 76 are movable into the envelope, under the back portion thereof, and are also movable outwardly with reference to the edge of the back.

The envelope may therefore be opened while on table 42 by the operation of fingers 76, and the letter sheet is then inserted by the conveying belts by means of which it was brought forward. When the stops 72 move downwardly, incident to the operation of the cam 74 at the left of Figure 3, the envelope with the letter sheet therein may move forwardly between rollers 85 and 86. Roller 85 constitutes a water receptacle, and it is provided with a filling opening 85′, and with a series of perforations such as 87, located opposite a fibrous element 88, adapted to be moistened, for the purpose of moistening the gummed flap of the envelope. The envelope moves into the channel shaped device 90, at the right of Figure 2, and when the forward edge engages the web or intermediate part 91, the envelope bends or buckles slightly, the rear edge thereupon coming into position for reception between rollers 86 and 86', which discharge the envelope, (as soon as the flap is turned down and sealed by contact with the rollers) into the final receptacle designated 95 and having a shelf or the like 96 held by light springs 97, so that the device 96 moves downwardly under the weight of the accumulated pile of envelopes, sealed, and containing the folded letter sheets.

The various steps of the operation are clearly shown in Figures 23 to 28 inclusive. Figure 23 shows the letter sheet being picked up from the pile in the container at the left of Figure 2, and in Figure 24, the letter sheet is receiving the first fold in device 44. In Figure 25, the letter sheet, folded once, has been buckled for the second fold between rollers 31 and 32, and the envelope is being brought to the table 42 for receiving the sheet when it shall have reached that position. (The pick-up operation with reference to the envelope is shown in the lower part of Figure 24.)

Figures 27, 28:
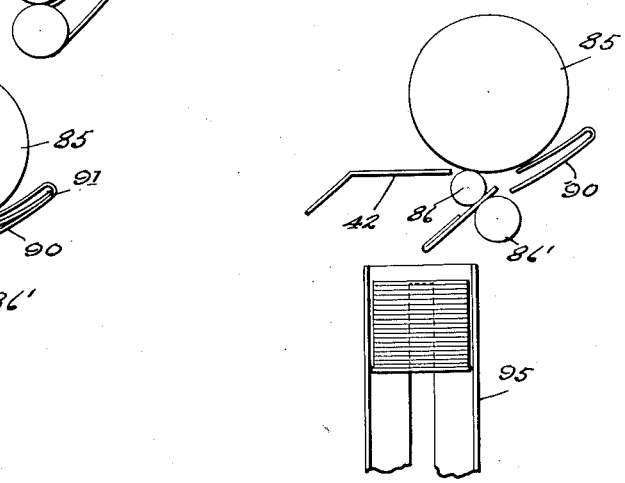
Figure 22:
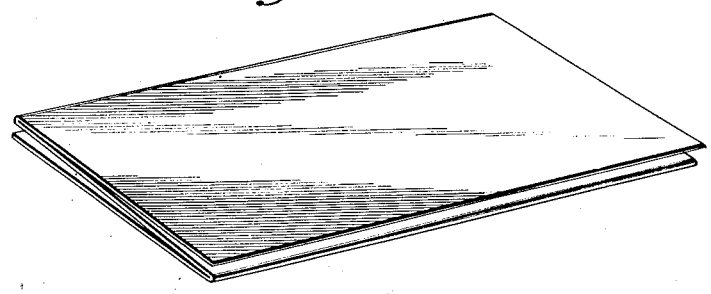
Figure 22 is a perspective view of a letter sheet folded in the manner usually followed when an addressed sheet is to be inserted in a window envelope.

The letter sheet in Figure 26, is about to enter the opened envelope, as the latter rests on table 42 and is in engagement with stops 72 temporarily holding the envelope while the sheet is being inserted. Figure 27 shows that the temporary holding device 71, or rather the stops 72 thereon, have moved downwardly to inoperative position, and the envolope has been carried into the device 90 constituting a channeled element having an end wall 91 where it will be engaged by the end or edge of the envelope, and a slight buckling will occur as illustrated in this view, and the envelope will drop downwardly into position for engagement between rollers 86 and 86', it being understood that the gummed flap has been moistened, and is now folded over, and pressed firmly into position for discharge in the manner shown in Figure 28. In the view last named, the final receptacle for the letters is designated 95, as in Figure 2.

Reference may be made to the fact that the first container 48 for the envelopes, carries or includes a floating bottom 49, held by springs 50, and the upper envelope is temporarily retained on the pile by ledges or ears 48ª.

The letter pick-up device of Figure 12, and the arm 55 thereof, merges into a horizontal portion 55', and extends then upwardly as shown at 55'' in Figure 3, being swung from point 55ª in the wall 12. The portion 55'' of the device is connected with a spring 55ᵇ, and the latter is controlled by cam 55ᶜ, at the right of Figure 3. The cam 74 at the left of the same view, controls the envelope stop plate 71 and the stops 72 of Figure 2.

A driving shaft is designated 100 in Figure 1, and movement is imparted thru gear wheels 101, 102, 103 and 104 to the shaft 81 mounting the roller 85 which carries the moistening device for the gummed flap of the envelope.

The rollers 86 and 86' below roller 85, are driven thru gear wheels 106 and 107, wheel 106 meshing with large gear wheel 104. The rollers 30, 31 and 32 which take care of the letter sheet during the first stage of the operation, and shown at the left in the upper portion of Figure 2, carry gear wheels shown at the right in Figure 3, and designated 108, 109 and 110, these gear wheels meshing in the manner shown in Figure 3 and being driven from gear wheel 101.

In Figure 29, I have shown a plan view of a portion of a machine equipped for folding a letter sheet in the middle, after which it is to be folded twice in a direction perpendicular to the fold first made, and in the manner usually followed when it is desired to place the sheet in a small envelope.

In this instance, the drive is thru shaft 100' of Figure 34, and thence thru gear wheels 115, 116 to shaft 117 to the gearing shown at the left of Figure 29.

The pick-up device for the sheet, in making the first fold, is shown in Figure 31, and the middle portion of the sheet passes between rollers 120 and 121, the sheet thus folded in the middle passing guide 122 and passing under roller 123, for discharge from this series of rollers to the tray or other suitable element designated 125 and having an upstanding edge portion 126 acting as a stop.

The letter sheet is then carried in a direction perpendicular to the path of movement up to this point, the initial shifting movement being effected thru slide or feeding device 128, having a tension spring 129 connected therewith and acting under the influence of cam 130 which imparts thrust to the device 128, when it contacts with the upstanding portion thereof, and thus moves the sheet towards the right in Figure 29. Cam 130 is pivoted at 131, and is connected at one extreme end with a rod 132 controlled by arm 133 acted upon by cam 134. This cam is on the shaft 117, and the several rollers 120, 121 and 123 of Figure 31 are driven by the meshing gear wheels 135, 136, 137, shown at the left of Figure 29 and in Figure 35.

The letter sheet having been folded in the middle, and moved towards the right, in Figure 29, by the operation of cam 130 and feeding device 128, passes to the series of rollers shown in Figure 32, and more particularly passes between rollers 140, 141 rotating in the direction shown by the arrows, and thence to the channel-shaped element 142, where the middle part of the fold, or rather the middle fold, is perpendicular to the axes of rollers 140 and 141. The edge of the sheet engages at 143, the sheet buckles upwardly between rollers 140 and 144, producing the second fold in the sheet, and this folded portion passes into the channel element 145, the folded part of the sheet engaging at 146, again causing buckling so that the sheet will be drawn into the space 147 between rollers 144 and 148, rotating in the direction shown, and drawing the completely folded sheet between these rollers, the third fold having been produced as the sheet entered the space between said rollers 144 and 148. The gearing for the rollers for the series shown in Figure 32 is illustrated in Figure 33, and includes the gear wheels 150, 151, 152 and 153, these gear wheels meshing in the manner shown in Figure 33, and wheel 151 being driven by pinion 154 and gear wheel 155, shown in Figures 33 and 29.

The folded sheets, ready for the envelopes, are carried forward by the conveyor bands 157 and 158, these elements last named corresponding with the sheet conveying means of the first form and located between the folding devices and the table 42, where the sheet enters the envelope.

Having thus described the invention, what is claimed as new, is:

1. A folding machine comprising a plurality of pick-up rollers, sheet feeding means adapted to urge sheets successively into contact with the rollers with substantially uniform pressure, said rollers being adapted to produce a single fold in the sheet, a cam means adapted to move the folded sheet into contact with a series of rollers and sheet buckling channel elements adapted to produce two folds perpendicular to the fold first made, and means actuating all said rollers and means in unison.

2. A folding machine comprising two horizontal pick-up rollers, sheet feeding means situated below said rollers and adapted to urge sheets successively into contact with the rollers with substantially uniform pressure and without substantial frictional resistance upon said sheets by said means when the sheets contact with the rollers, said rollers being adapted to produce a single fold approximately in the middle of the sheet, a third roller for changing the discharge direction of the folded sheet, from vertical to horizontal, cam means for moving the folded sheet horizontally in a direction perpendicular to its last direction, a series of rollers and channel elements adapted to produce two folds perpendicular to the fold first made, and means actuating all said rollers and means in unison.

In testimony whereof I affix my signature.

SAMUEL J. T. PRICE.